United States Patent [19]

Bindra

[11] 4,397,730
[45] Aug. 9, 1983

[54] ELECTROLYTIC CELLS WITH ALKALINE ELECTROLYTES CONTAINING TRIFLUOROMETHYLANE SULFONIC ACID

[75] Inventor: Perminder S. Bindra, Ossining, N.Y.

[73] Assignee: International Business Machines Corporation, Armonk, N.Y.

[21] Appl. No.: 394,013

[22] Filed: Jun. 30, 1982

[51] Int. Cl.$^3$ .......................... H01M 8/08; C25B 1/10
[52] U.S. Cl. ...................................... 204/252; 429/46; 429/198; 429/29; 204/98; 204/128
[58] Field of Search .................... 429/29, 46, 198, 40; 204/98, 128, 252

[56] References Cited

U.S. PATENT DOCUMENTS

| | | | |
|---|---|---|---|
| 3,379,573 | 4/1968 | Gershberg | 429/46 |
| 3,592,696 | 7/1971 | Palmer | 429/46 |
| 3,948,681 | 4/1976 | Barger et al. | 429/46 |
| 4,074,028 | 2/1978 | Will | 429/198 |

OTHER PUBLICATIONS

Adams et al., A New Electrolyte for Hydrocarbon Air Fuel Cells, J. Electrochem. Soc., Aug. 1974, pp. 987-990.

*Primary Examiner*—Donald L. Walton
*Attorney, Agent, or Firm*—Graham S. Jones

[57] ABSTRACT

An electrolytic system is provided with a gas fed cathode in contact with an electrolyte to which an additive of trifluoromethane sulfonic acid (TFMSA) is added. The system can be employed in fuel cells, industrial electrolytic cells for production of gases such as chlorine, and in metal-air batteries. Preferably the porous cathode incorporates a catalyst such as gold, platinum, palladium, silver, and spinels of Ni and Co. The supply of fluid to the anode of the fuel cell is a hydrocarbon or $H_2$ dissolved in NaOH. Oxygen or air is supplied to the cathode of the fuel cell. In the industrial electrolytic cell, the anodic source of fluid and electrolyte is brine solution, and the cathodic electrolyte is dilute caustic. In the metal-air battery, an anodic solution of NaOH is supplied to an anode of Al, Ga, Zn, etc. The cathodic solution and configuration are the same as with the fuel cell.

13 Claims, 3 Drawing Figures

MEMBRANE CELL

ELECTROLYTIC CELLS WITH ALKALINE ELECTROLYTES CONTAINING TRIFLUOROMETHYLANE SULFONIC ACID

BACKGROUND OF THE INVENTION

1. Technical Field of the Invention

This invention relates to electrolytes and more particularly to alkaline electrolytes as employed in fuel cells, industrial electrolytic cells such as cells for chlorine electrolysis, and metal-air batteries.

2. Background Art

U.S. Pat. No. 3,948,681 of Barger et al "Fuel Cell Utilizing Direct Hydrocarbon Oxidation" describes a fuel cell with an electrolyte comprising $CF_3SO_3H.H_2O$, which is the monohydrate of trifluoromethyl sulfonic acid. Other electrolytes described there include higher homologues of the monohydrate and different acid to $H_2O$ ratios. No suggestion of mixing trifluoromethane sulfonic acid (TFMSA) with other electrolytes appears in that patent. The cathode and anode are constructed from a noble metal such as platinum mixed with carbon and polyethyleneterephthalate (Teflon) and supported on graphite. U.S. Pat. No. 3,379,573 of Gershberg for "Fluorinated Polymer with Fluorinated Surfactant and Fuel Cell Therewith" describes a fuel cell with an electrolyte of KOH plus ammonium perfluorocaprylate and porous electrodes with electrodes of Pt, Pd or Ag. Alternatively, ammonium perfluoronyl sulfonate is the surfactant in the electrolyte.

In U.S. Pat. No. 4,118,550 of Koch for "Aprotic Solvent Electrolytes and Batteries Using Same" Col. 7 mentions the use of a lithium salt of TFMSA as a solute in an electrochemical cell having a lithium negative electrode, with an electrolyte comprising an ionically dissociable solute in the form of a lithium salt and a solvent for the salt. There is no suggestion of adding TFMSA to an electrolyte.

A problem with batteries, fuel cells and industrial electrolytic cells is that limited solubility of oxygen tends to limit current for a given potential. This results in excessive polarization of the cathode (the oxygen electrode). The total cell voltage in fuel cells, metal-air batteries, and industrial electrolytic cells can be resolved into components which add as $$E = E° + \eta_a + \eta_c + IR$$

where I is the total current flow, E° is the thermodynamically reversible potential, R the resistance due to the separator and electrolyte and $\eta_a$ and $\eta_c$ the overpotentials of the anode and cathode respectively.

In accordance with this invention, TFMSA is used as an additive to alkaline electrolytes to lower the cathode polarization $\eta_c$ in the types of cells including fuel cells, batteries and industrial electrolytic cells. Preferably, at least one of the electrodes is a gas-fed porous structure incorporating a catalyst of a material selected from the group consisting of gold, platinum, palladium and silver or a nonmetal such as Ni and Co spinels.

SUMMARY OF THE INVENTION

In accordance with this invention, an electrolytic system is provided including an anode and a cathode and at least one electrolyte located between said anode and said cathode and the electrolyte plus TFMSA being included in a solution together between the cathode and the anode. Preferably, at least one of the electrodes is composed of a porous gas fed structure incorporating a catalyst of a material selected from the group consisting of gold, platinum, palladium, silver and spinels of Ni and Co.

The electrolyte comprises an alkaline solution of KOH and TFMSA, the cathode comprises a porous material composed of carbon, with the cathode being supplied with a source of oxygen gas, and with the anode being composed of a porous dimensionally stable material with a source of a fuel material supplied to the opposite surface of the anode from the electrolyte whereby the electrolyte is supplied with fuel and oxygen to produce electrical energy between the anode and the cathode as a result of oxidation facilitated by TFMSA.

The system can also comprise a metal-air battery, which can include an anodic electrolyte and an anode which react to provide battery action between the anode and the cathode. In other words the action of the electrolyte on the anode is to react with the anode and to yield electrons. Preferably, the anode comprises a metal selected from the group consisting of Al, Ga and Zn and the anodic electrolyte comprises NaOH in aqueous solution.

This system can be embodied in an industrial electrolytic cell for manufacture of gas including a liquid electrolyte, which cell includes an ion exchange membrane with electrolytes on opposite sides of the membrane in contact with the cathode and the anode respectively. It is preferred that one of the electrolytes is a solution of a salt and the other of the electrolytes comprises an electrolyte adapted to consume the cations from the salt. Preferably, one of said electrolytes comprises a basic solution of a cation combined with halide to form a halide salt. The halide salt can comprise NaCl in a brine solution and the other electrolyte is caustic NaOH. It is desirable that the electrode structure incorporates gold as a catalyst.

DESCRIPTION OF THE PREFERRED EMBODIMENT

FUEL CELL

Figure 1:
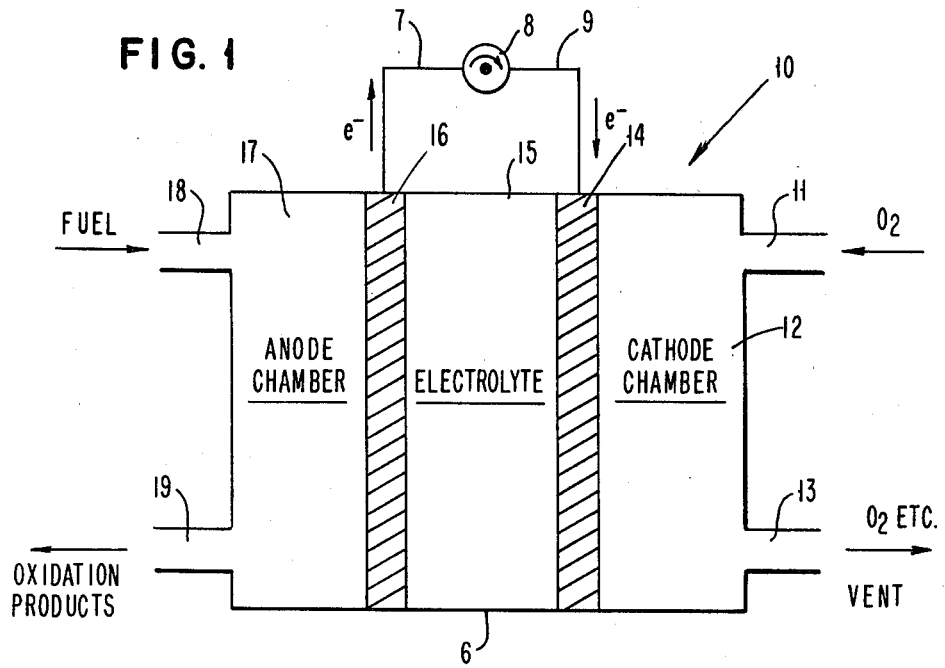
FIG. 1 shows a diagram of a fuel cell incorporating an electrolyte and a structure in accordance with this invention.

FIG. 1 shows a fuel cell 10 with a cathode chamber 12 for oxygen gas supplied at inlet 11 and exhausted from chamber 12 at vent 13. The cathode 14 forms the left wall of the cathode chamber and the oxygen gas can pass from the chamber 12 through the porous cathode into the electrolyte 15 which is on the other surface of the cathode 14 which is a thin flat sheet of a porous material such as compressed graphite or RB carbon. The electrolyte comprises an alkaline electrolyte aqueous solution such as 4.0–5.0 M KOH (or higher concentrations).

In accordance with this invention, 1 Mole of TFMSA is added to the KOH electrolyte solution. The electrolyte is prepared by adding purified TFMSA to pre-electrolyzed KOH solution.

A porous anode electrode 16 forms the other wall of the container for the electrolyte 15 on the opposite side of the electrolyte from cathode 14. Electrode 16 is also preferably metallic, dimensionally stable anode.

The lower surface of the electrolyte chamber is provided by base 6 which is composed of non-corrosive material as will be well understood by those skilled in the art with the walls not shown being composed of an impermeable corrosion resistant material sealed so that the electrolyte cannot be lost from the container formed by the anode 14, the cathode 16 and the base 6 and other components of the container.

The other surface of anode 16 (opposite from electrolyte 15) defines a wall of anode chamber 17 which accepts a fuel selected from the group consisting in part of hydrocarbons, such as alcohols including methanol, aldehydes such as formaldehyde, and hydrogen dissolved in NaOH aqueous solution preferably under greater than atmospheric pressure. Fuel is supplied at inlet 18 to chamber 17. Exhaust products consisting of $CO_2$, $H_2O$ and other by products of the oxidation-reduction processes are exhausted from chamber 17 by line 19. Fuel is admitted to the anode chamber 17 from fuel inlet 18 and the oxidation products are exhausted from exhaust 19 by means of a pump which provides circulation of the electrolyte plus fuel and other oxidation products through the chamber 17.

High surface area gold catalyst is located inside the cathode structure to provide $O_2$ reduction which results in formation of $H_2O$ of $OH^-$. Other metals which can be used as catalysts include Pt, Pd and Ag and non-metallic catalysts such as Ni, and Co spinels.

INDUSTRIAL ELECTROLYTIC CELL

Figure 2:
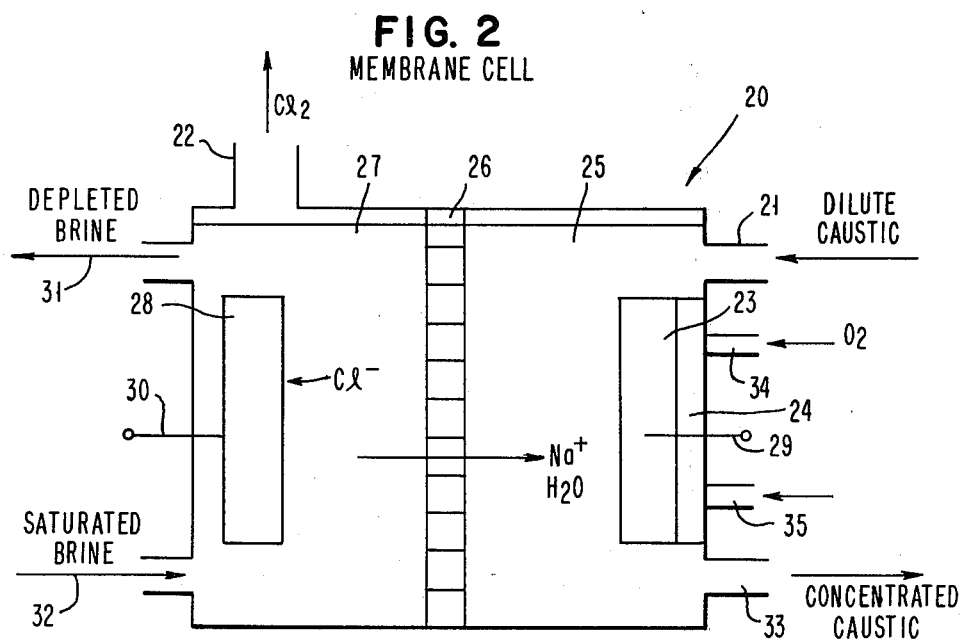
FIG. 2 shows another fuel cell in accordance with this invention employing a membrane cell, as contrasted with porous electrodes, to provide chlorine in an industrial electrolytic process.

FIG. 2 shows a single cell of a multiple cell industrial chlorine manufacturing system in schematic, diagrammatic form. A membrane cell 20 includes an inlet 21 for diluted caustic (NaOH) plus TFMSA in aqueous solution. A cathode chamber 25 contains concentrated caustic solution which is exhausted from the cell in outlet line 33. A gas fed porous cathode 23 is supplied with oxygen gas from cathode chamber 24 which is supplied with oxygen gas from line 34. The oxygen gas exhausts from chamber 24 via line 35. There is an anode chamber 27 which contains saturated brine (aqueous solution of NaCl). Chamber 27 is connected to or separated from chamber 25 by means of fluorinated ion exchange membrane 26, which permits $Na^+$ ions to pass from chamber 27 to chamber 25. The ions present in cathode chamber 25 include $Na^+$, $OH^-$.

The anode 28 comprises a dimensionally stable anode (DSA) composed of materials including $RuO_2$, and $SnO_2$ on a Ti base preferably. Such materials are commercially available from proprietary sources. The saturated brine for the anode chamber 27 is supplied by the inlet line 32. Depleted brine leaves the chamber on line 31. The result of the process is the liberation of $Cl_2$ gas which passes from the anode chamber 27 via outlet vent 22. The $Na^+$ ions in the system which are attached to the cathode 23 combine with $OH^-$ ions in the solution to form concentrated caustic. The source of the $OH^-$ ions required is water for the hydrogen and half of the oxygen. The remaining oxygen is supplied by the porous cathode from the chamber 24. The TFMSA in the solution of caustic is located in the chamber 25 although in some cases some could pass through the membrane 26. The TFMSA is primarily effective at the cathode and can be present in the anodic solution without adverse effect.

Metal-Air Batteries

Referring again to FIG. 1, a metal-air battery using the same configuration can employ, as an electrolyte admitted to the inlet 18 to the anode chamber 17, an alkaline solution in water such as an aqueous solution of NaOH in either a weak or strong solution.

Aluminum Anode

Assuming that the anode 16 is composed of aluminum, then the anodic reactions occuring in the metal-air battery are as follows:

Weakly alkaline solution

Strong alkaline solution

Cathodic Reaction

In any case in the metal-air batteries in accordance with the preferred embodiment, the cathode chamber 12 is supplied with $O_2$ gas which undergoes the cathodic reaction in electrolyte 15 as follows:

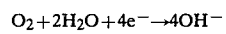

In accordance with this invention, the TFMSA and preferably the catalyt (Au, etc. Supra) are employed to obtain the desired effect.

Gallium Anode

In the case in which the anode 16 is composed of Ga, the reaction involved is as follows:

Other electrode materials for the anode 16 include zinc and similar anodic metals.

Figure 3:
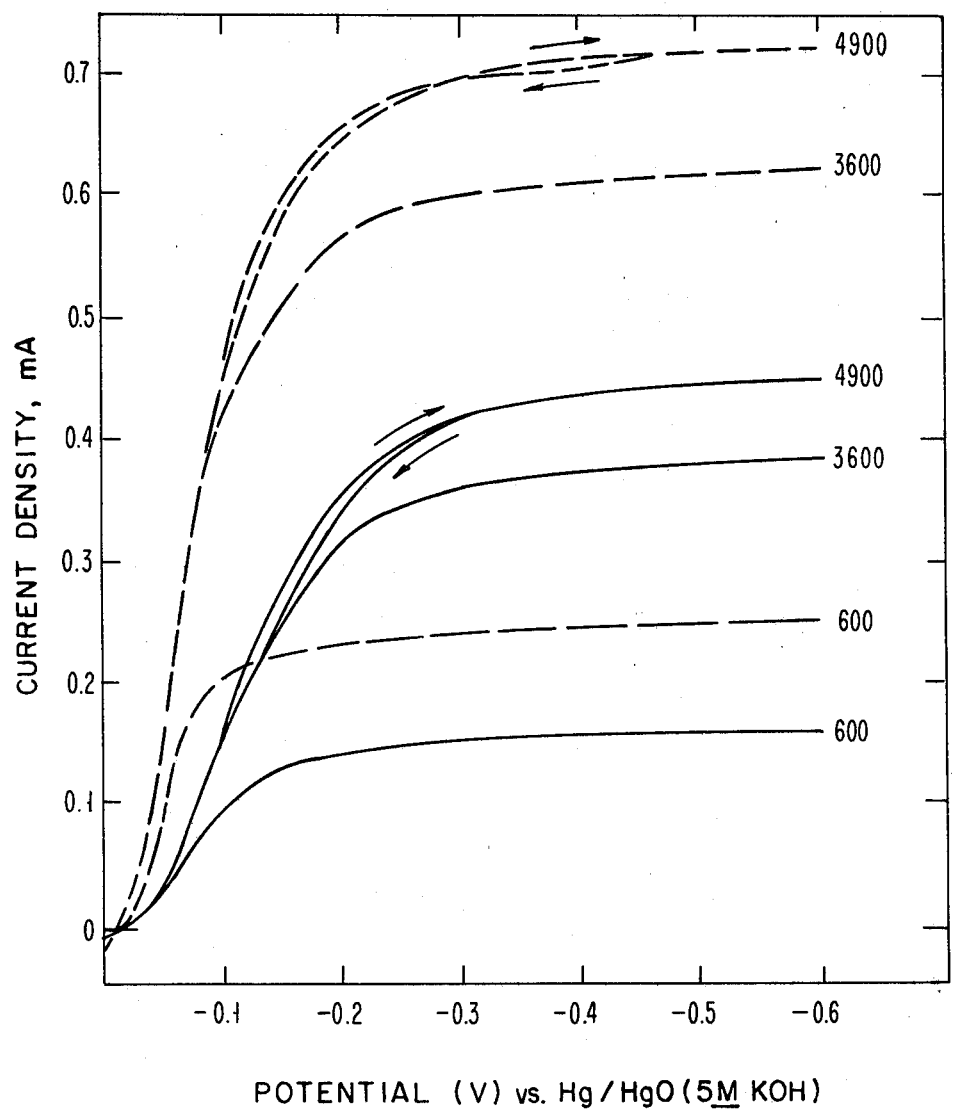
FIG. 3 shows a graph of current density as a function of potential for oxygen reduction on a gold disk electrode.

Trifluoromethane sulfonic acid (TFMSA) is used as an additive to alkaline electrolytes to lower the polarization of oxygen cathodes in fuel cells, metal-air batteries and industrial electrolytic cells. It has been found that the addition of TFMSA to concentrated alkali solution lowers very substantially the polarization for $O_2$ reduction on gold. This is illustrated in FIG. 3 which is a plot of potential (V) vs. Hg/HgO (5 M KOH) for $O_2$ reduction on gold disk electrode at 22° C. The sweep rate=5 mV/s. Rotation rates are indicated, and the arrows indicate sweep direction. Solutions indicated are 5 M KOH (—solid lines) and 4 M KOH+1 M TFMSA (—dashed lines). The current-voltage curves for $O_2$ reduction on gold in 5 M KOH and in 4 M KOH+1.0 M TFMSA (corresponding to approximately constant ionic strength) are compared using the well known rotating disk electrode technique. The TFMSA-KOH solution was prepared by adding purified TFMSA to pre-electrolyzed KOH solution. $O_2$ reduction on gold normally proceeds primarily to hydrogen peroxide thus

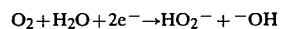 (1)

The increment in limiting current density in the presence of TFMSA is caused mainly by the shift of the reaction to favor the overall 4-electron reduction $$O_2 + 2H_2O + 4e^- \rightarrow eOH^- \qquad (2)$$

Rotating ring-disk electrode measurements confirm that essentially four electrons are being realized per molecule for oxygen reaching the electrode with less than 1% of the total current leading to hydrogen peroxide. In the absence of TFMSA, the number of electrons realized per molecule of $O_2$ is typically about 2.5 electrons. Also, quite important is the shift in half wave potential produced by the addition of the TFMSA. The $O_2$ reduction at a given over-potential is considerably faster in the presence of TFMSA. The mechanism by which these changes occur has not been well established yet.

The present invention is particularly effective in improving the effectiveness of Au as a catalyst in the cathodic reaction in an electrolytic reaction in any of the above embodiments and other electrolytic cells as will be well understood in accordance with the teachings of this invention. In the past Au has suffered as a catalyst as compared with Pt in that the current obtained was inferior to that achieved with the Pt. With the addition of TFMSA, the performance of Pt is improved, but the performance of Au is improved further to the point that the current and power obtained are comparable for Au and Pt. However, in view of the greater nobility of Au than Pt, the life of the Au electrode is longer, since Au is more noble and is not very soluble in the electrolyte. In other words, the catalytic activity of Au and TFMSA in combination is comparable to the catalytic activity of Pt alone or with TFMSA but the Au containing electrode has a longer life.

This invention provides an improvement in fuel cells and the like with alkaline electrolytes by means of adding trifluoromethane sulfonic acid (TFMSA) as an additive to alkaline electrolytes. This reduces the polarization and thereby produces a higher amount of current for a given potential almost by a factor of 2:1 at certain values.

Having thus described my invention, what I claim as new, and desire to secure by Letters Patent is:

1. An electrolytic system with an anode electrode and a cathode electrode and at least one electrolyte between said anode and said cathode and said electrolyte plus TFMSA being included in a solution together between said cathode and said anode.

2. An electrolytic system in accordance with claim 1 wherein at least one of said electrodes is composed of a porous gas fed structure.

3. An electrolytic system in accordance with claim 2 wherein said electrode structure incorporates a catalyst of a material selected from the group consisting of gold, platinum, palladium, silver and spinels of Ni and Co.

4. An electrolytic system in accordance with claim 1, 2 or 3 wherein said electrolyte comprises an alkaline solution of KOH and TFMSA, said cathode comprises a porous material composed of carbon, with said cathode being supplied with a source of oxygen gas, and with said anode being composed of a porous dimensionally stable material with a source of a fuel material supplied to the opposite surface of said anode from said electrolyte whereby said electrolyte is supplied with fuel and oxygen to produce electrical energy between said anode and said cathode as a result of oxidation facilitated by said TFMSA.

5. An electrolytic system in accordance with claim 1 wherein an industrial electrolytic cell for manufacture of gas includes a liquid electrolyte.

6. A system in accordance with claim 5 wherein said cell includes an ion exchange membrane with electrolytes on opposite sides of said membrane in contact with said cathode and said anode respectively.

7. A system in accordance with claim 6 wherein one of said electrolytes is a solution of a salt and the other of said electrolytes comprises an electrolyte adapted to consume the cations from said salt.

8. A system in accordance with claim 7 wherein one of said electrolytes comprises a basic solution of a cation combined with said halide forming a halide salt.

9. A system in accordance with claim 8 wherein said halide salt comprises NaCl in a brine solution and the other electrolyte is caustic NaOH.

10. A system in accordance with claim 1 or 2 wherein said electrode structure incorporates gold as a catalyst.

11. A system in accordance with claim 1, 2 or 3 wherein said system comprises a metal-air battery.

12. A system in accordance with claim 11 wherein said metal-air battery includes an anodic electrolyte and said anode which react to provide battery action between said anode and said cathode. In other words the action of the electrolyte on the anode is to react with the anode and to yield electrons.

13. A system in accordance with claim 12 wherein the said anode comprises a metal selected from the group consisting of Al, Ga and Zn and said anodic electrolyte comprises NaOH in aqueous solution.

* * * * *

UNITED STATES PATENT AND TRADEMARK OFFICE
CERTIFICATE OF CORRECTION

PATENT NO. : 4,397,730
DATED : August 9, 1983
INVENTOR(S) : P. S. Bindra

It is certified that error appears in the above-identified patent and that said Letters Patent is hereby corrected as shown below:

Column 5, line 48, after "electrolyte" insert --located--.

Signed and Sealed this

Twenty-sixth Day of August 1986

[SEAL]

Attest:

DONALD J. QUIGG

Attesting Officer

Commissioner of Patents and Trademarks